United States Patent
BenHanokh et al.

(10) Patent No.: US 11,809,709 B2
(45) Date of Patent: Nov. 7, 2023

(54) METADATA SIZE REDUCTION FOR DATA OBJECTS IN CLOUD STORAGE SYSTEMS

(71) Applicant: RED HAT, INC., Raleigh, NC (US)

(72) Inventors: Gabriel Zvi BenHanokh, Tel-Aviv (IL); Joshua Durgin, Canyon Country, CA (US)

(73) Assignee: RED HAT, INC., Raleigh, NC (US)

( * ) Notice: Subject to any disclaimer, the term of this patent is extended or adjusted under 35 U.S.C. 154(b) by 0 days.

(21) Appl. No.: 17/189,790

(22) Filed: Mar. 2, 2021

(65) Prior Publication Data

US 2022/0283709 A1  Sep. 8, 2022

(51) Int. Cl.
*G06F 3/06* (2006.01)

(52) U.S. Cl.
CPC ............ *G06F 3/0608* (2013.01); *G06F 3/067* (2013.01); *G06F 3/0619* (2013.01); *G06F 3/0638* (2013.01)

(58) Field of Classification Search
None
See application file for complete search history.

(56) References Cited

U.S. PATENT DOCUMENTS

| | | | | |
|---|---|---|---|---|
| 5,913,217 | A * | 6/1999 | Alger | G06F 16/9014 713/502 |
| 6,134,597 | A * | 10/2000 | Rieth | H04L 69/22 709/217 |
| 8,849,825 | B1 | 9/2014 | McHugh et al. | |
| 10,108,547 | B2 | 10/2018 | Pundir et al. | |
| 10,185,718 | B1 * | 1/2019 | Wilkinson | G06F 16/22 |
| 10,409,524 | B1 * | 9/2019 | Branover | G06F 3/0634 |
| 10,409,778 | B1 * | 9/2019 | Zhao | G06F 16/2365 |
| 10,706,101 | B2 | 7/2020 | Breslow et al. | |
| 10,761,758 | B2 | 9/2020 | Doerner et al. | |
| 2002/0029297 | A1 * | 3/2002 | Cavanaugh | G06F 9/465 719/315 |
| 2003/0200197 | A1 * | 10/2003 | Long | H04L 63/10 |
| 2005/0283645 | A1 * | 12/2005 | Turner | G06F 11/1076 714/4.11 |
| 2007/0179981 | A1 * | 8/2007 | Vincent | G06F 3/067 |
| 2010/0274772 | A1 * | 10/2010 | Samuels | G06F 16/188 707/693 |

(Continued)

OTHER PUBLICATIONS

Hoch, E.N., et al., "Bizur: A Key-Value Consensus Algorithm for Scalable File-systems," Feb. 14, 2017, https://arxiv.org/pdf/1702.04242.pdf.

(Continued)

*Primary Examiner* — Yaima Rigol
(74) *Attorney, Agent, or Firm* — Kilpatrick Townsend & Stockton LLP

(57) ABSTRACT

Metadata sizes for data objects in cloud storage systems can be reduced. For example, a computing system can receive, at a client device of a cloud storage system, a first object identifier associated with a data object in the cloud storage system. The computing system can use a reduction function to generate a second object identifier associated with the data object. The second object identifier can have a smaller byte size than the first object identifier. The computing system can transmit, to a server of the cloud storage system, the second object identifier to be stored in metadata associated with the data object in the cloud storage system.

20 Claims, 3 Drawing Sheets

(56) References Cited

U.S. PATENT DOCUMENTS

| | | | |
|---|---|---|---|
| 2014/0280471 A1* | 9/2014 | Lavi | H04L 67/289 |
| | | | 709/203 |
| 2015/0280959 A1* | 10/2015 | Vincent | G06F 16/1774 |
| | | | 709/203 |
| 2016/0335158 A1* | 11/2016 | De Schrijver | G06F 3/064 |
| 2017/0185625 A1 | 6/2017 | Cheru et al. | |
| 2018/0145826 A1* | 5/2018 | Greatwood | G06F 3/067 |
| 2020/0159629 A1 | 5/2020 | Zhang et al. | |
| 2020/0319909 A1 | 10/2020 | Jawahar et al. | |

OTHER PUBLICATIONS

McLeod, S., et al., "SNMP Object Identifer Compression," Internet Engineering Task Force, Apr. 2001, https://www.ietf.org/proceedings/53/I-D/draft-ietf-eos-oidcompression-00.txt.

* cited by examiner

METADATA SIZE REDUCTION FOR DATA OBJECTS IN CLOUD STORAGE SYSTEMS

TECHNICAL FIELD

The present disclosure relates generally to cloud storage systems. More specifically, but not by way of limitation, this disclosure relates to metadata size reduction for data objects in cloud storage systems.

BACKGROUND

Cloud storage systems can store data objects that can be accessed by client devices. Each data object can be associated with an object identifier that uniquely identifies the data object. When a client device requests access to the data object, the client device can transmit the object identifier to a server that compares the object identifier to object identifiers for each data object until the server locates the object identifier that matches the received object identifier. The server can then transmit the data object to the client device.

In distributed storage systems, a data object can be distributed across multiple storage nodes. Each storage node can include the metadata with the object identifier for the data object. Additionally, one or more instances of the data object may be erasure-coded. Erasure coding involves fragmenting data and encoding the fragments with additional data so that the original data can be reconstructed if it becomes corrupted. Each erasure-coded fragment can also include the metadata with the object identifier. Therefore, the metadata can be present multiple times within the cloud storage system.

DETAILED DESCRIPTION

Figure 1:
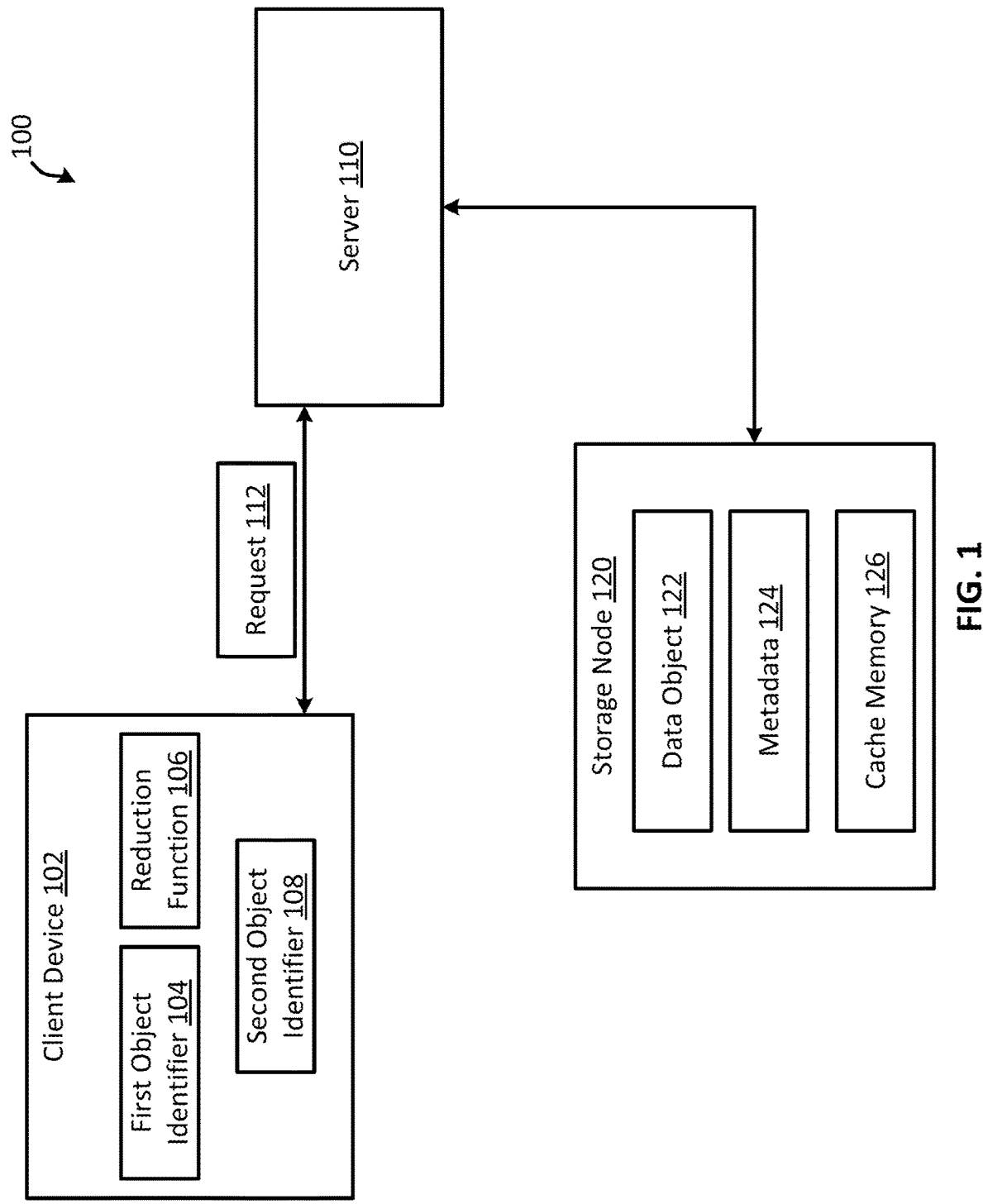
FIG. 1 is a block diagram of an example of a cloud storage system for implementing metadata size reduction for data objects according to some aspects of the present disclosure.

Data object identifiers for data objects in cloud storage systems are often hundreds to thousands of bytes long. Therefore, data object identifiers can burden storage nodes, since each operation involves a byte comparison of the full data object identifier. Additionally, the data object identifiers can be stored in metadata for the data objects, which consumes valuable metadata space. The data object identifiers for different data objects may vary in length, so memory fragmentation of the metadata may additionally occur. In some cloud storage systems, a data object can be distributed across multiple storage nodes. Each storage node can include the metadata with the data object identifier. Additionally, each portion of the data object can be erasure-coded, with each piece of the erasure-coding storing the metadata as well. Therefore, the data object identifier may be present hundreds or thousands of times in cloud storage systems. Because of this, data object retrieval is often computationally intensive and time-intensive.

Some examples of the present disclosure can overcome one or more of the abovementioned problems by providing a system that reduces metadata associated with a data object. The system can receive, at a client device, a first object identifier associated with a data object in the cloud storage system. The system can use a reduction function to generate a second object identifier associated with the data object. The second object identifier can have a smaller byte size than the first object identifier. For example, the first object identifier can be one kilobyte and the second object identifier can be sixteen bytes. The system can transmit the second object identifier from the client device to a server of to be stored in metadata associated with the data object. This can significantly reduce the size of metadata associated with data objects, so more metadata can fit in a cache memory. As a result, data objects may be retrieved faster. Additionally, memory fragmentation and comparison operations for locating data objects may be reduced.

One particular example can involve client device receiving a first object identifier for a data object. The first data object can be one kilobyte long. The client device can then use a reduction function, such as a hashing function, to generate a second object identifier for the data object. The second object identifier can be a smaller number of bytes than the first object identifier. For example, the second object identifier can be sixteen bytes. The client device can transmit the second object identifier to a server, which can store the second object identifier in metadata for the data object. The client device may then transmit a request including the second object identifier for the data object to the server. The server can use the second object identifier to locate the data object and transmit the data object to the client device.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a cloud storage system 100 for implementing metadata size reduction according to some aspects of the present disclosure. The cloud storage system 100 can include a client device 102, a server 110, and a storage node 120. Examples of the client device 102 can include a desktop computer, a laptop, a mobile phone, server, etc. The client device 102, the server 110, and the storage node 120 can communicate over a network, such as a local area network (LAN) or the Internet.

In some examples, the client device 102 can store object identifiers associated with data objects stored in the storage node 120. Each object identifier can uniquely identify a data object in the storage node 120 and may be used to access the data object. For example, a first object identifier 104 can 1024 bytes that uniquely identify a data object 122 in the storage node 120. The client device 102 can request the data object 122 by providing the first object identifier 104 to the server 110. The server 110 can then compare the first object identifier 104 to an object identifier stored in metadata 124 associated with the data object 122. Upon determining the first object identifier 104 matches the object identifier for the data object 122, the server 110 can transmit the data object 122 to the client device 102. Each byte of the first object identifier 104 can be compared to the object identifier in the metadata 124 to verify the correct data object is returned to the client device 102. Therefore, comparison operations for long object identifiers (e.g., over 100 bytes) can be computationally expensive for the cloud storage system 100. Additionally, long object identifiers can result in the metadata 124 being large and taking up lots of space in cache memory. This may also result in memory fragmentation of the metadata 124.

Data objects may additionally be distributed across multiple storage nodes of the cloud storage system 100. For example, the storage node 120 may store a first portion of the data object 122 and other storage nodes (not shown) may store remaining portions of the data object 122. Hundreds or thousands of storage nodes may be used to store the data object 122. Each storage node can store the metadata 124 with the first object identifier 104. In addition, each portion may be erasure-coded, and each piece of the erasure-coding can also store the metadata 124. Thus, the first object identifier 104 may be repeated hundreds or thousands of time within the cloud storage system 100 and consume a large amount of resources, such as disk, memory, network, and central processing unit (CPU).

The cloud storage system 100 can reduce the size of the first object identifier 104 to improve performance of the cloud storage system 100. To do so, the client device 102 can generate a second object identifier 108 that also uniquely identifies the data object 122 and has a smaller number of bytes than the first object identifier 104. For example, the second object identifier 108 may be sixteen bytes. The client device 102 can use a reduction function 106 to generate the second object identifier 108. For example, the reduction function 106 may be a hashing function that uses hardware capabilities on storage or network interface controllers to generate the second object identifier 108. Additional examples of the reduction function 106 can include a random number generator or any other function capable of generating an object identifier that is smaller than the first object identifier 104. In some examples, the second object identifier 108 can have a predefined byte size, such as sixteen bytes.

The client device 102 can then transmit the second object identifier 108 to the server 110 to be stored in the metadata 124 for the data object 122. The server 110 can be configured to replace the first object identifier 104 with the second object identifier 108 in the metadata 124. Thus, the size of the metadata 124 can be greatly reduced by replacing the first object identifier 104 with the second object identifier 108. The first object identifier 104 can be replaced with the second object identifier 108 in each instance of the metadata 124 in the cloud storage system 100. Thus, in examples where the data object 122 is distributed across multiple storage nodes, the resources consumed by storing the metadata 124 hundreds or thousands of times can be significantly reduced. The byte size of the second object identifier 108 may additionally be known by the server 110 or the storage node 120, so memory fragmentation can be reduced or eliminated.

Once the server 110 stores the second object identifier 108 in the metadata 124, the client device 102 can then transmit a request 112 to the server 110 that includes the second object identifier 108 for the data object 122. The server 110 can retrieve the data object 122 based on the second object identifier 108 and transmit the data object 122 to the client device 102. The comparison between the second object identifier 108 and the metadata 124 can be computationally less expensive than comparing the first object identifier 104 to the metadata 124.

Additionally, more metadata with second object identifiers for data objects may fit in a cache memory compared to metadata with first object identifiers. Since accessing cache memory is faster than accessing a disk, this may improve the speed at which requested data objects can be retrieved and transmitted to client devices. For example, the storage node 120 may include space for two kilobytes, or two thousand forty-eight bytes, of metadata in a cache memory 126. The metadata 124 with the first object identifier 104 for the data object 122 can be one kilobyte. First object identifiers for a second data object and a third data object can also each be one kilobyte. Therefore, the total metadata for the data objects can be three kilobytes, which cannot all fit in the cache memory 126. However, subsequent to the server 110 receiving the second object identifier 108 for the data object 122 and second object identifiers for the second data object and the third data object that are each sixteen bytes, the total metadata for the data objects can be forty-eight bytes. Thus, the metadata for each data object can fit in the cache memory 126. There can also be two thousand bytes of space leftover for metadata of additional data objects. Since more metadata can fit in the cache memory 126, the time for the server 110 to retrieve and transmit data objects to client devices may be reduced.

In some examples, the client device 102 can maintain an association between the first object identifier 104 and the data object 122. For each operation involving the data object 122, such as read and write operations, the client device 102 can apply the reduction function 106 to the first object identifier 104 to generate the second object identifier 108. The client device 102 can then transmit the second object identifier 108 to the server 110, which can locate the data object 122 based on the second object identifier 108 and perform the requested operation.

In other examples, the client device 102 can store a mapping between the first object identifier 104 and the second object identifier 108 for the data object 122. Storing the mapping can reduce CPU overhead for the client device 102 since the client device 102 will only perform the reduction function 106 once for the first object identifier 104. The client device 102 may alternatively not maintain the mapping, and instead a gateway in communication with the client device 102 can store the mapping. The gateway can store the mapping in metadata, such that the first object identifier 104 and the second object identifier 108 for the data object 122 can be provided when requested from the gateway. Although the cloud storage system 100 illustrates one data object, other examples may include more data objects. The mapping stored by the client device 102 or the gateway can include first object identifiers and second object identifiers for each data object in the cloud storage system 100.

FIG. 1 is illustrative and non-limiting. Other examples may include more components, fewer components, different components, or a different arrangement of the components shown in FIG. 1. For example, although the cloud storage system 100 includes once client device and one data object in the example of FIG. 1, the cloud storage system 100 may include a larger number of client devices and data objects in other examples.

Figure 2:
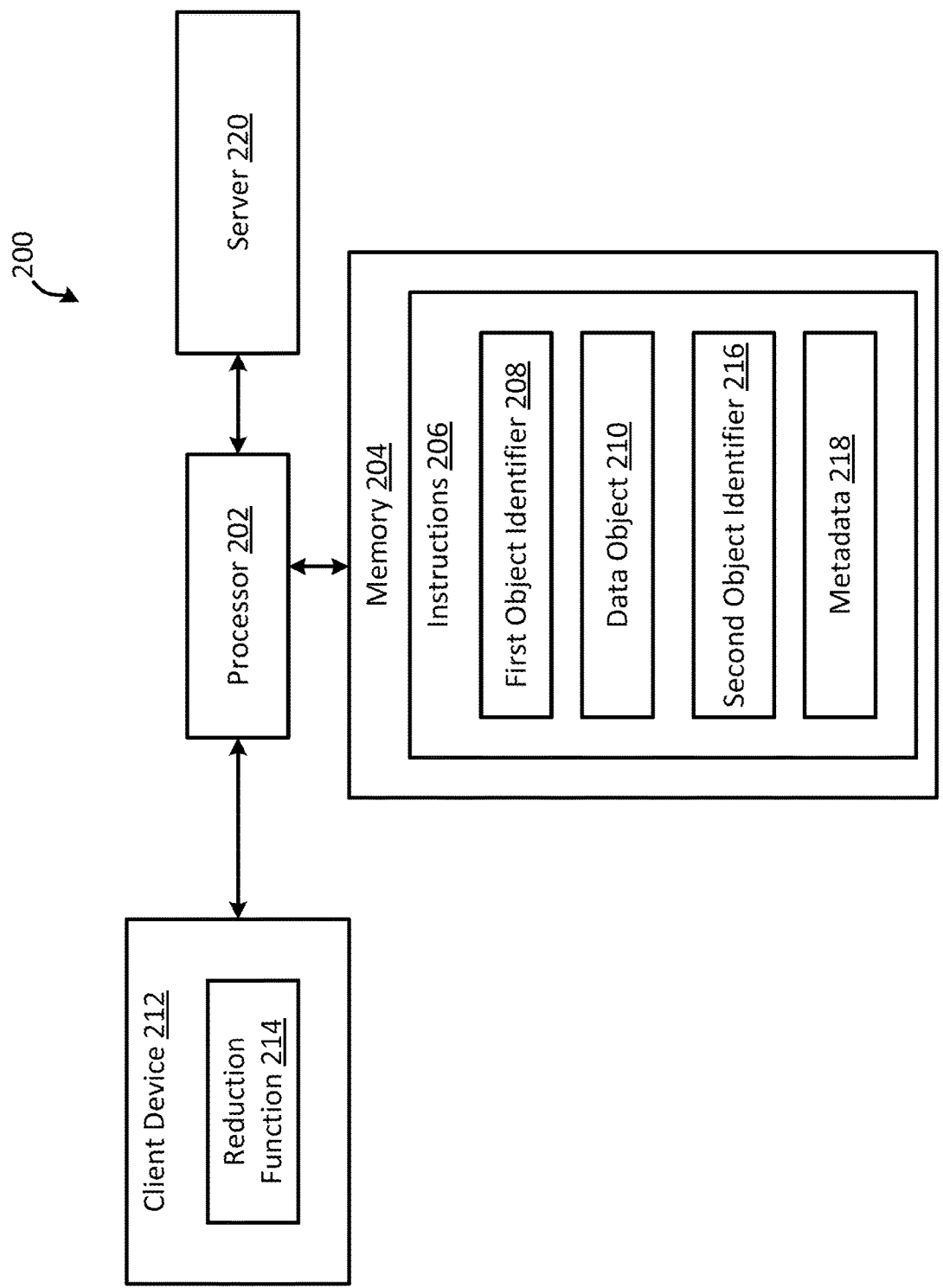
FIG. 2 is a block diagram of another example of a cloud storage system for implementing metadata size reduction for data objects according to some aspects of the present disclosure.

FIG. 2 is a block diagram of another example of a cloud storage system 200 for implementing metadata size reduction according to some aspects of the present disclosure. The cloud storage system 200 includes a processor 202. The processor 202 may be part of a client device, such as the client device 102 in FIG. 1.

In this example, the processor 202 is communicatively coupled with a memory 204. The processor 202 can include one processor or multiple processors. Non-limiting examples of the processor 202 include a Field-Programmable Gate Array (FPGA), an application-specific integrated circuit (ASIC), a microprocessor, etc. The processor 202 can execute instructions 206 stored in the memory 204 to perform operations. The instructions 206 can include processor-specific instructions generated by a compiler or an interpreter from code written in any suitable computer-programming language, such as C, C++, C#, etc.

The memory 204 can include one memory or multiple memories. Non-limiting examples of the memory 204 can include electrically erasable and programmable read-only memory (EEPROM), flash memory, or any other type of non-volatile memory. At least some of the memory 204 includes a non-transitory computer-readable medium from which the processor 202 can read the instructions 206. The non-transitory computer-readable medium can include electronic, optical, magnetic, or other storage devices capable of providing the processor 202 with computer-readable instructions or other program code. Examples of the non-transitory computer-readable medium can include magnetic disks, memory chips, ROM, random-access memory (RAM), an ASIC, optical storage, or any other medium from which a computer processor can read the instructions 206.

In some examples, the processor 202 can execute the instructions 206 to perform operations. For example, the processor 202 can receive, at a client device 212 of the cloud storage system 200, a first object identifier 208 associated with a data object 210 in the cloud storage system 200. The processor 202 can use a reduction function 214 to generate a second object identifier 216 associated with the data object 210. The second object identifier 216 can have a smaller byte size than the first object identifier 208. For example, the first object identifier 208 may be one kilobyte and the second object identifier may be sixteen bytes. The processor 202 can transmit, to a server 220 of the cloud storage system 200, the second object identifier 216 to be stored in metadata 218 associated with the data object 210 in the cloud storage system 200. This may reduce a size of the metadata 218, resulting in reduced computational requirements and increase speed for accessing the data object 210.

Figure 3:
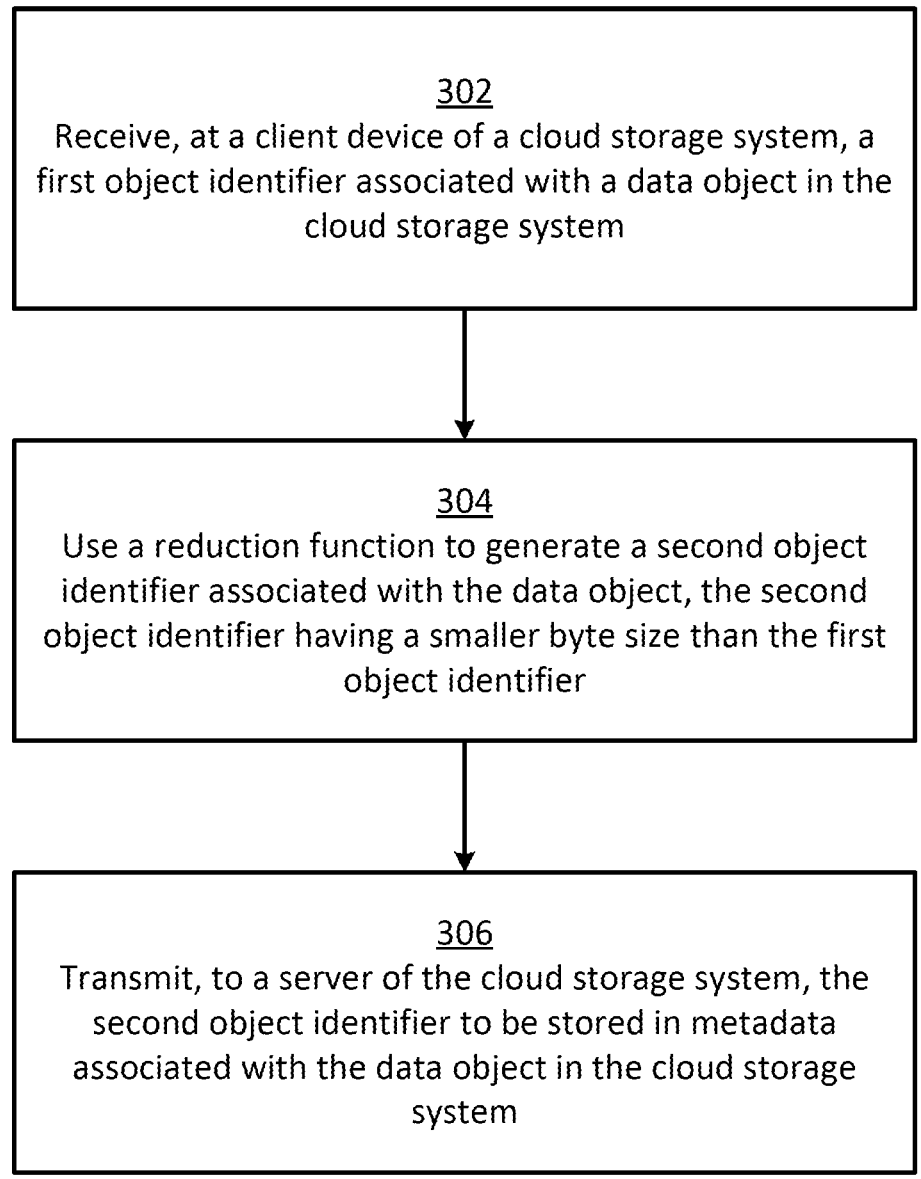
FIG. 3 is a flow chart of a process for metadata size reduction for data objects in cloud storage systems according to some aspects of the present disclosure.

The processor 202 can implement some or all of the steps shown in FIG. 3. Other examples can include more steps, fewer steps, different steps, or a different order of the steps than is shown in FIG. 3. The steps of FIG. 3 are discussed below with reference to the components discussed above in relation to FIG. 2.

In block 302, the processor 202 can receive, at a client device 212 of the cloud storage system 200, a first object identifier 208 associated with a data object 210 in the cloud storage system 200. The first object identifier 208 can be a key usable in retrieving the data object 210. The first object identifier 208 can be more than one hundred bytes long.

In block 304, the processor 202 can use a reduction function 214 to generate a second object identifier 216 associated with the data object 210. The second object identifier 216 can have a smaller byte size than the first object identifier 208. For example, the second object identifier can be less than one hundred bytes. The reduction function 214 may be a hashing function implemented in hardware of the client device 212. Additionally, the second object identifier 216 generated by the reduction function 214 may have a predefined byte size, such as thirty-two bytes.

In block 306, the processor 202 can transmit, to a server 220 of the cloud storage system 200, the second object identifier 216 to be stored in metadata 218 associated with the data object 210 in the cloud storage system 200. In some examples, the metadata 218 can include the first object identifier 208 prior to the server 220 receiving the second object identifier 216. In such examples, the second object identifier 216 can replace the first object identifier 208 in the metadata 218. Additionally, some examples can involve the data object 210 being distributed across a plurality of storage nodes of the cloud storage system 200. In such examples, the second object identifier 216 can be stored in metadata of each instance of the data object 210. Reducing the size of the metadata 218 can reduce computation for storing and retrieving data objects in the cloud storage system 200. In addition, metadata with second object identifiers associated with a greater number of data objects can fit in a cache memory, which may result in faster retrieval of data objects.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. A system comprising:
a processor; and
a memory including instructions that are executable by the processor for causing the processor to:
receive, at a client device of a cloud storage system, a first object identifier associated with a data object in the cloud storage system, a first portion of the data object being stored in a first storage node of the cloud storage system and other portions of the data object being stored in other storage nodes of the cloud storage system;
use a reduction function to generate a second object identifier associated with the data object, the second object identifier having a smaller byte size than the first object identifier;
store, by the client device, a mapping between the first object identifier and the second object identifier; and
transmit, to a server of the cloud storage system, the second object identifier to be stored in metadata associated with the data object in a cache memory of the first storage node of the cloud storage system.

2. The system of claim 1, wherein the memory further includes instructions that are executable by the processor for causing the processor to:
transmit a request for the data object from the client device to the server, the request including the second object identifier; and
receive the data object from the server, the data object being retrieved by the server based on the second object identifier.

3. The system of claim 2, wherein the memory further includes instructions that are executable by the processor for causing the processor to maintain the first object identifier associated with the data object in the client device.

4. The system of claim 1, wherein the system is configured to store the metadata that includes the first object identifier prior to the reduction function being used and the server is configured to store the second object identifier in the metadata by replacing the first object identifier with the second object identifier.

5. The system of claim 1, wherein each node is configured to store the second object identifier associated with the data object.

6. The system of claim 1, wherein the memory includes instructions that are executable by the processor for causing the processor to use the reduction function to generate the second object identifier by applying the reduction function to the first object identifier to generate the second object identifier, wherein the second object identifier comprises a predefined byte size and is usable to retrieve the data object from the cloud storage system.

7. The system of claim 1, wherein the reduction function comprises a hashing function configured to generate the second object identifier usable to retrieve the data object from the cloud storage system in response to a request for the data object.

8. A computer-implemented method comprising:
receiving, at a client device of a cloud storage system, a first object identifier associated with a data object in the cloud storage system, a first portion of the data object being stored in a first storage node of the cloud storage system and other portions of the data object being stored in other storage nodes of the cloud storage system;
using a reduction function to generate a second object identifier associated with the data object, the second object identifier having a smaller byte size than the first object identifier;
storing, by the client device, a mapping between the first object identifier and the second object identifier; and
transmitting, to a server of the cloud storage system, the second object identifier to be stored in metadata associated with the data object in a cache memory of the first storage node of the cloud storage system.

9. The method of claim 8, further comprising:
transmitting a request for the data object from the client device to the server, the request including the second object identifier; and
receiving the data object from the server, the data object being retrieved by the server based on the second object identifier.

10. The method of claim 9, further comprising maintaining the first object identifier associated with the data object in the client device.

11. The method of claim 8, wherein the cloud storage system is configured to store the metadata that includes the first object identifier prior to the reduction function being used and the server is configured to store the second object identifier in the metadata by replacing the first object identifier with the second object identifier.

12. The method of claim 8, wherein each node stores the second object identifier associated with the data object.

13. The method of claim 8, further comprising using the reduction function to generate the second object identifier by applying the reduction function to the first object identifier to generate the second object identifier, wherein the second object identifier comprises a predefined byte size and is usable to retrieve the data object from the cloud storage system.

14. The method of claim 8, wherein the reduction function comprises a hashing function configured to generate the second object identifier usable to retrieve the data object from the cloud storage system in response to a request for the data object.

15. A non-transitory computer-readable medium comprising program code that is executable by a processor for causing the processor to:
receive, at a client device of a cloud storage system, a first object identifier associated with a data object in the cloud storage system, a first portion of the data object being stored in a first storage node of the cloud storage system and other portions of the data object being stored in other storage nodes of the cloud storage system;
use a reduction function to generate a second object identifier associated with the data object, the second object identifier having a smaller byte size than the first object identifier;
store, by the client device, a mapping between the first object identifier and the second object identifier; and
transmit, to a server of the cloud storage system, the second object identifier to be stored in metadata associated with the data object in a cache memory of the first storage node of the cloud storage system.

16. The non-transitory computer-readable medium of claim 15, further comprising program code that is executable by the processor for causing the processor to:
transmit a request for the data object from the client device to the server, the request including the second object identifier; and
receive the data object from the server, the data object being retrieved by the server based on the second object identifier.

17. The non-transitory computer-readable medium of claim 16, further comprising program code that is executable by the processor for causing the processor to maintain the first object identifier associated with the data object in the client device.

18. The non-transitory computer-readable medium of claim 15, wherein the cloud storage system is configured to store the metadata that includes the first object identifier prior to the reduction function being used and the server is configured to store the second object identifier in the metadata by replacing the first object identifier with the second object identifier.

19. The non-transitory computer-readable medium of claim 15, wherein each node is configured to store the second object identifier associated with the data object.

20. The non-transitory computer-readable medium of claim 15, further comprising program code that is executable by the processor for causing the processor to use the reduction function to generate the second object identifier by applying the reduction function to the first object identifier to generate the second object identifier, wherein the second object identifier comprises a predefined byte size and is usable to retrieve the data object from the cloud storage system.

* * * * *